United States Patent
Shim et al.

(10) Patent No.: US 11,606,452 B2
(45) Date of Patent: Mar. 14, 2023

(54) MOBILE TERMINAL

(71) Applicant: LG ELECTRONICS INC., Seoul (KR)

(72) Inventors: Hongjo Shim, Seoul (KR); Hyunwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 17/043,470

(22) PCT Filed: May 29, 2018

(86) PCT No.: PCT/KR2018/006058
§ 371 (c)(1),
(2) Date: Sep. 29, 2020

(87) PCT Pub. No.: WO2019/230999
PCT Pub. Date: Dec. 5, 2019

(65) Prior Publication Data
US 2021/0120113 A1    Apr. 22, 2021

(51) Int. Cl.
*H04M 1/02*    (2006.01)
(52) U.S. Cl.
CPC ...... *H04M 1/0266* (2013.01); *H04M 2250/22* (2013.01)
(58) Field of Classification Search
CPC .......... H04M 1/0266; H04M 2250/22; H04M 1/72412; H04M 2250/12; H04M 1/026;
(Continued)

(56) References Cited

U.S. PATENT DOCUMENTS 7,372,447 B1* 5/2008 Jacobsen .............. G09G 3/3648
348/14.02
8,907,752 B2* 12/2014 Wodrich .................. G06F 1/26
335/304
(Continued)

FOREIGN PATENT DOCUMENTS

KR    10-2013-0106503 A    9/2013
KR    10-2014-0024038 A    2/2014
(Continued)

OTHER PUBLICATIONS

Anonymous, Method of Double Sided Touch Control on Touch Devices, Dec. 28, 2016, ip.com, IPCOM000248701D, All pages (Year: 2016).*

(Continued)

*Primary Examiner* — Lewis G West
(74) *Attorney, Agent, or Firm* — Birch, Stewart, Kolasch & Birch, LLP

(57) ABSTRACT

A mobile terminal comprises: a main body; a display in the front surface of the main body; a coil antenna module positioned in a first region of the rear surface of the main body; and a rear touch sensor positioned in a second region of the rear surface of the main body to sense a touch input of a user, wherein the first region and the second region do not overlap each other. Since the rear touch sensor is provided within a limited space of the mobile terminal, the difficulty of one-handed manipulation can be reduced.

18 Claims, 12 Drawing Sheets

(58) Field of Classification Search
CPC ........... H04M 1/0277; H04M 2201/34; H04M 1/724; H02J 7/02
See application file for complete search history.

(56) References Cited

U.S. PATENT DOCUMENTS

| | | | | |
|---|---|---|---|---|
| 9,246,214 | B2* | 1/2016 | Pope | H01Q 7/06 |
| 9,411,446 | B2* | 8/2016 | Lombardi | H04M 1/026 |
| 2014/0080411 | A1* | 3/2014 | Konanur | H04B 5/0025 |
| | | | | 455/41.1 |
| 2014/0176371 | A1* | 6/2014 | Liao | G06F 1/1643 |
| | | | | 343/702 |
| 2014/0333328 | A1* | 11/2014 | Nelson | G06F 3/0416 |
| | | | | 324/663 |
| 2015/0277592 | A1* | 10/2015 | Nishigaki | H02J 50/90 |
| | | | | 345/173 |
| 2016/0094076 | A1* | 3/2016 | Kasar | H02J 7/0042 |
| | | | | 320/103 |
| 2016/0211702 | A1* | 7/2016 | Muratov | H02J 50/10 |
| 2016/0253540 | A1* | 9/2016 | Han | G06V 40/1306 |
| | | | | 382/124 |
| 2018/0165494 | A1* | 6/2018 | Kim | G06F 3/044 |
| 2018/0322323 | A1* | 11/2018 | Ran | G06F 1/1684 |
| 2020/0026379 | A1* | 1/2020 | Horikoshi | G06F 3/044 |
| 2020/0099245 | A1* | 3/2020 | Ruscher | H02J 7/025 |
| 2021/0383373 | A1* | 12/2021 | Eirinberg | G06Q 20/3821 |
| 2021/0409531 | A1* | 12/2021 | Shim | H04M 1/0237 |
| 2022/0091688 | A1* | 3/2022 | Kim | H04M 1/0283 |
| 2022/0176891 | A1* | 6/2022 | Shain | H05K 5/0204 |

FOREIGN PATENT DOCUMENTS

| | | |
|---|---|---|
| KR | 10-2015-0109597 A | 10/2015 |
| KR | 10-1558439 B1 | 10/2015 |
| KR | 10-2018-0002846 A | 1/2018 |

OTHER PUBLICATIONS

SCEI, Playstation Vita User's Guide, 2013, Sony Computer Entertainment Inc., Version 2.60, All Pages (Year: 2013).*

* cited by examiner (a)

(b)

(c)

(a)

(b)

MOBILE TERMINAL

CROSS REFERENCE TO RELATED APPLICATIONS

This application is the National Phase of PCT International Application No. PCT/KR2018/006058, filed on May 29, 2018, all of which is hereby expressly incorporated by reference into the present application.

TECHNICAL FIELD

The present disclosure relates to a mobile terminal with a back-side touch sensor.

BACKGROUND ART

In general, terminals may be classified into mobile/portable terminals and stationary terminals according to their mobility. Mobile terminals may be classified into handheld terminals and vehicle mounted terminals depending on whether or not a user can directly carry the terminal.

The functions of mobile terminals have been diversified. For example, the functions may include data and voice communication, photographing and video shooting through a camera, voice recording, playing a music file through a speaker system, and displaying an image or video on a display unit. Some terminals further include an electronic game play function or perform a multimedia player function. In particular, in recent years, mobile terminals may receive multicast signals that provide visual content such as broadcast, video or television programs.

As the terminal has become multifunctional, for example, capturing still images or moving images, playing music or video files, playing games, receiving broadcast, etc., the terminal has been implemented as a multimedia player with various functions.

To support and enhance the functions of the terminal, the improvement of structural or software elements of the terminal may be taken into consideration.

SUMMARY OF THE DISCLOSURE

The object of the present disclosure is to provide a mobile terminal with a back-side touch sensor capable of receiving a touch input using a limited space on the back side thereof.

In one aspect of the present disclosure, a mobile terminal may include: a main body; a display disposed on a front surface of the main body; a coil antenna module disposed in a first area on a rear surface of the main body; and a back-side touch sensor disposed in a second area on the rear surface of the main body and configured to detect a touch input of a user. The first and second areas may not overlap with each other.

The second area may be surrounded by the first area.

The mobile terminal may further include a fingerprint recognition sensor disposed in a third area on the rear surface of the main body, wherein the third area may be adjacent to the second area and surrounded by the first area.

The main body may further include a rear case forming an exterior of the rear surface of the main body, wherein the coil antenna module, the back-side touch sensor, and the fingerprint recognition sensor may be disposed on an inner surface of the rear case. The rear case may have a smaller thickness in the third area than other areas.

The thickness of the rear case in the third area may be smaller than or equal to 0.3 mm.

An outer surface of the rear case may include a concavely curved surface corresponding to the third area.

The back-side touch sensor may be configured to sense touch by detecting a change in signal strength between a plurality of first electrodes arranged with a predetermined interval. The fingerprint recognition sensor may be configured to sense a curve of a fingerprint by detecting a change in signal strength between a plurality of second electrodes arranged with a predetermined interval. The interval between the second electrodes may be smaller than the interval between the first electrodes.

The mobile terminal may further include: a rear case forming an exterior of the rear surface of the main body; and a flexible substrate disposed on a front surface of the rear case. The coil antenna module may include a coil made of a conductive material and formed on the flexible substrate, and the back-side touch sensor may include a plurality of electrodes arranged with a predetermined interval and formed on the flexible substrate.

The mobile terminal may include a ferrite sheet or a nano crystal line. The ferrite sheet or the nano crystal line may be disposed on a front surface of the flexible substrate and cover at least part of the first area.

The mobile terminal may further include a heat radiation sheet. The heat radiation sheet may be disposed on a front surface of the flexible substrate and cover at least part of the first area.

The mobile terminal may further include a stiffener. The stiffener may be disposed on a front surface of the flexible substrate and cover at least part of the second area.

The back-side touch sensor may include: a flexible substrate; and a strain gauge disposed on a surface of the flexible substrate. The strain gauge may include a plurality of elements, each of which has a resistance value changing when the flexible substrate is bent.

The mobile terminal may further include a rear case forming an exterior of the rear surface of the main body, wherein the strain gauge may be coupled to an inner surface of the rear case; a middle frame or a main substrate disposed in a front surface direction of the strain gauge; and an air gap formed between the strain gauge and the middle frame or main substrate.

The back-side touch sensor may include: a metal thin film disposed on a rear case forming an exterior of the rear surface of the main body; and a plurality of sensing coil disposed apart from the metal thin film. The touch input may be detected based on a counter-electromotive force in the plurality of sensing coils.

The coil antenna module may include: a wireless power coil configured to wirelessly charge a battery; and a near field communication (NFC) coil configured to perform short-range wireless communication. The back-side touch sensor may be surrounded by the NFC coil.

The mobile terminal may include: a back-side button disposed on the rear surface of the main body; and a flexible substrate in which a signal line configured to transmit a signal input through the back-side button to a main substrate is formed. The back-side touch sensor may be formed on the flexible substrate.

Advantageous Effects

According to the present disclosure, a mobile terminal may include a back-side touch sensor in a limited space. Accordingly, a user may easily manipulate the mobile terminal with one hand.

In addition, a front display unit may be further enlarged by providing a fingerprint recognition sensor, which was disposed on the front surface of the mobile terminal in the related art, on the rear surface of the mobile terminal. The finger recognition sensor may be used as a sensor for detecting a touch input, thereby improving the space utility of the mobile terminal.

The additional applicability of the present disclosure will become apparent from the detailed description given hereinafter. However, it should be understood that the detailed description and specific examples such as preferred embodiments of the present disclosure are given by way of illustration only, since various changes and modifications within the spirit and scope of the present disclosure will become apparent to those skilled in the art from this detailed description.

DETAILED DESCRIPTION OF THE EMBODIMENTS

Figure 1A:
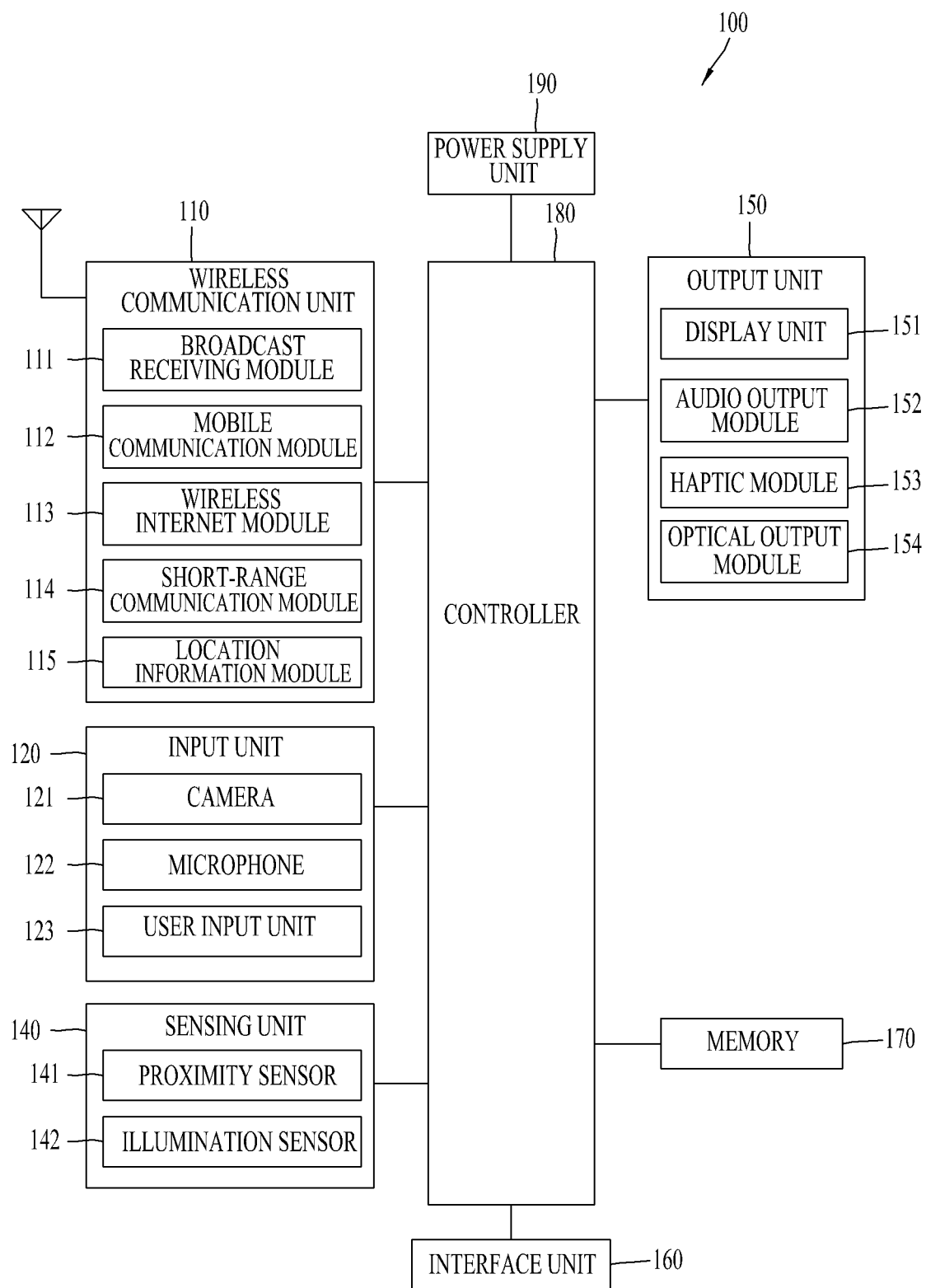
FIG. 1A is a block diagram for explaining a mobile terminal according to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
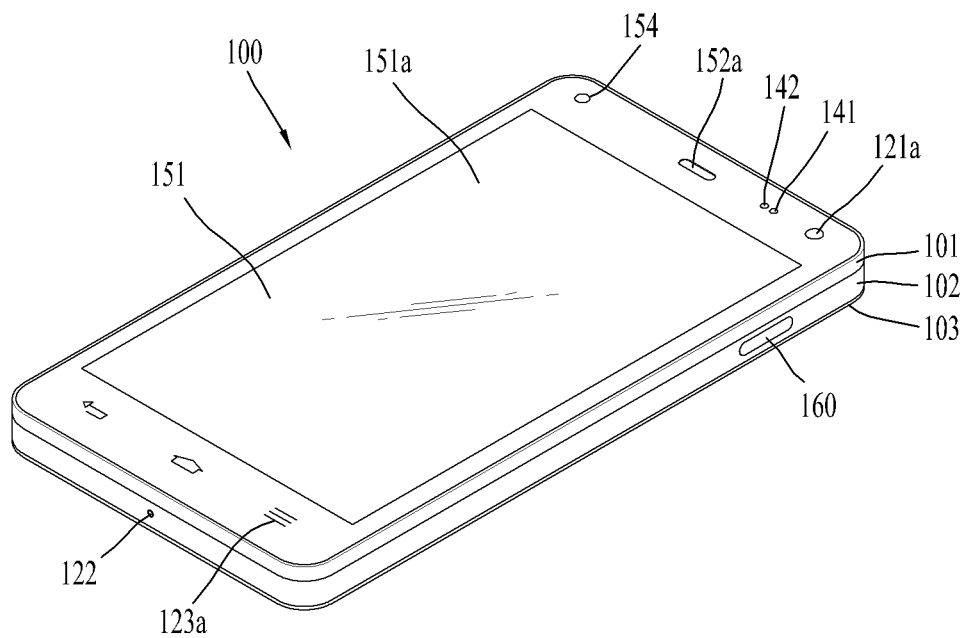
FIGS. 1b and 1c are conceptual views of one example of the mobile terminal according to the present disclosure viewed from different directions.
Figure 1C:
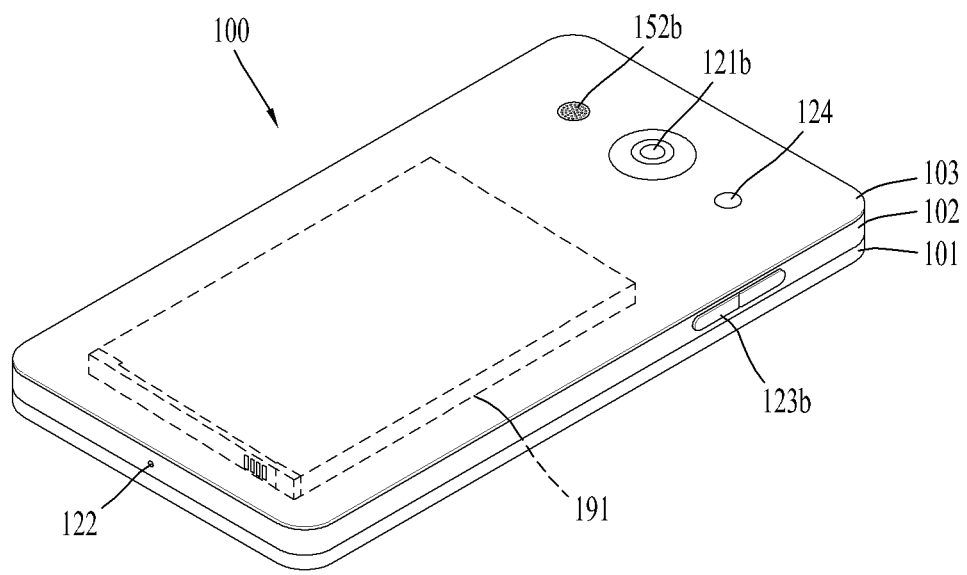

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1A, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first and second audio output modules 152a and 152b, the proximity sensor 141, the illuminance sensor 142, the optical output module 154, the first and second cameras 121a and 121b, the first and second manipulation units 123a and 123b, the microphone 122 and the interface unit 160.

It will be described for the mobile terminal as shown in FIGS. 1B and 1C. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
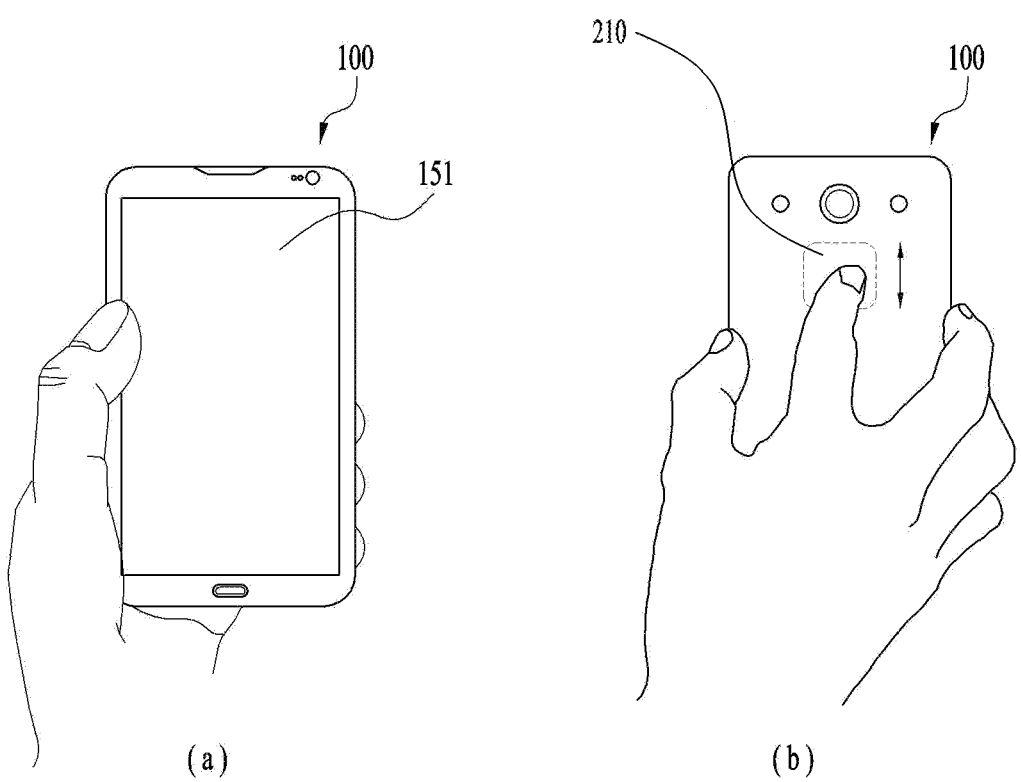
FIG. 2 is a view for explaining the utility of a back-side touch sensor of the mobile terminal according to the present disclosure.

FIG. 2 is a view for explaining the utility of a back-side touch sensor 210 of the mobile terminal 100 according to the present disclosure. As the front-side display unit 151 has become large in recent years, the size of the mobile terminal 100 has also increased. As a result, when a user provides a touch input with one hand holding the mobile terminal 100 as shown in FIG. 2 (a), the user may feel uncomfortable in moving the fingers and let the mobile terminal 100 slip, that is, the usability thereof may be degraded. For these reasons, some users may prefer the mobile terminal 100 with a small screen.

To solve the above problem, the present disclosure proposes that the back-side touch sensor 210 is disposed on the rear surface of the main body of the mobile terminal 100 as shown in FIG. 2 (b) to allow the user to send an input on the rear surface of the mobile terminal 100. Although some conventional mobile terminals have a back-side button, the number of commands capable of being input through the back-side button may be limited, and it may also be difficult to perform scrolling or touching and dragging on the screen. If too many buttons are provided on the rear case 102, the design of the rear surface may be degraded.

Figure 3:
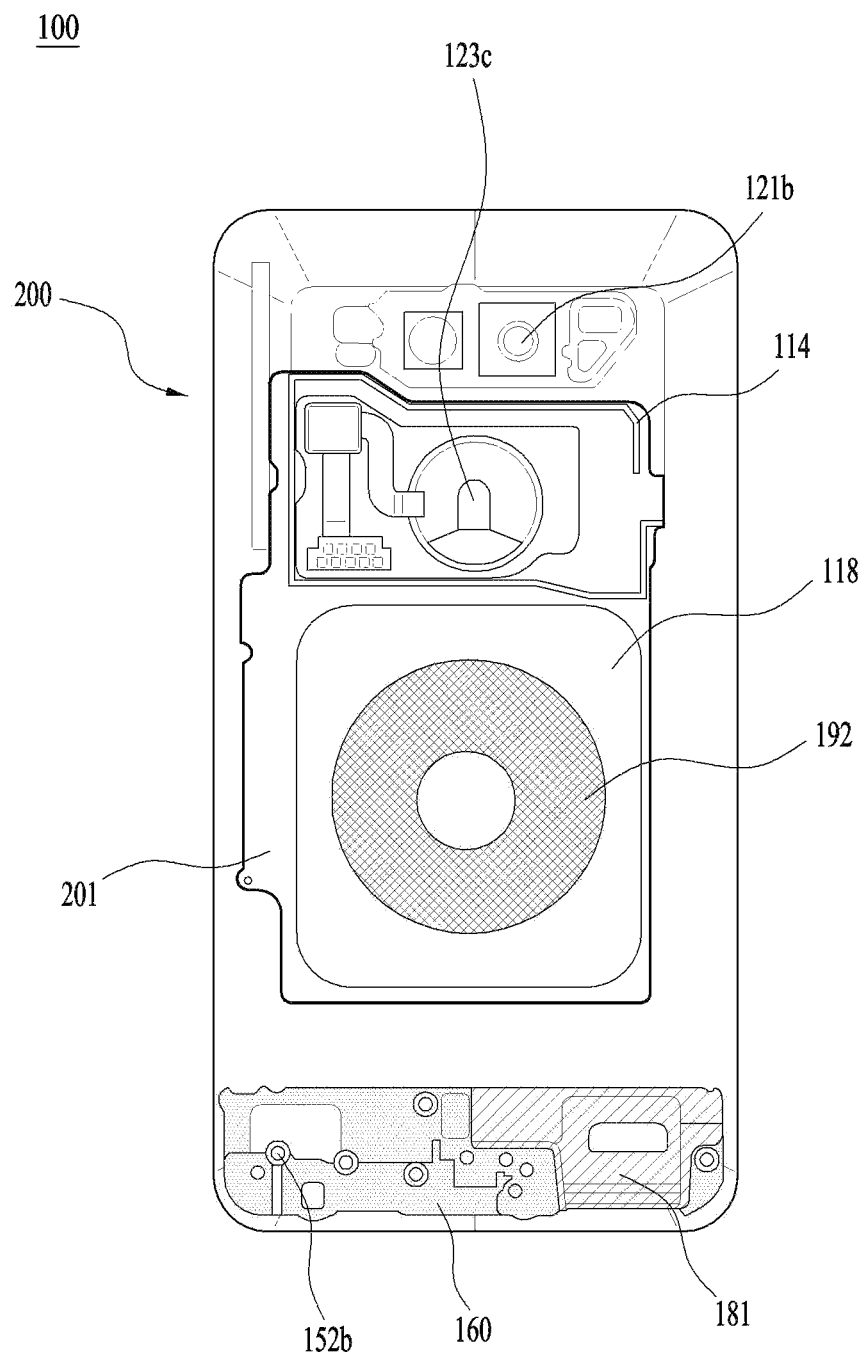
FIG. 3 is a view showing a coil antenna module disposed on the rear surface of the mobile terminal according to the present disclosure.

When the back-side touch sensor 210 is provided as described in the present disclosure, the user may not need to extend the fingers excessively in order to provide a touch input on the front surface, and thus the user may easily manipulate the mobile terminal 100 with one hand while holding the mobile terminal 100 with the band. When a touch sensor is provided on the entire rear surface of the mobile terminal 100, the user may provide various inputs. However, in this case, even when the user just holds the mobile terminal 100, the mobile terminal 100 may erroneously recognize that the user intends to provide an input. Recently, a coil antenna module 200 has been mounted in the mobile terminal 100 as shown in FIG. 3. FIG. 3 is a view showing a coil antenna module 200 disposed on the rear surface of the mobile terminal 100 according to the present disclosure.

Referring to FIG. 3, the coil antenna module 200 may be disposed on the rear surface of the mobile terminal 100. The coil antenna module 200 may include a spiral conductive material disposed on an insulating material such as a flexible substrate 201. The coil antenna module 200 may include a plurality of coils. The coil antenna module 200 may perform signal transmission and reception or battery charging using the electromagnetic wave of each coil without connections to external devices. The coil antenna may include at least one of a near field communication (NFC) antenna 114, a wireless charging coil 192, and a payment antenna 118.

NFC refers to a non-contact wireless communication technology capable of exchanging data using a frequency band of 13.56 MHz in a short distance of about 10 cm. This technology may be installed in a smartphone and serve as a transport card, a credit card, a membership card, a coupon, an identification card, etc. An NFC antenna may refer to an antenna for NFC. Since the display unit 150 is disposed on the front surface of the mobile terminal 100, radio communication may be difficult. Thus, the NFC antenna may be disposed on the rear surface of the mobile terminal 100.

The NFC may operate in any one of a card mode, a reader mode, and a peer-to-peer (P2P) mode. The mobile terminal 100 may further include a security module configured to store card information in order for the NFC module to operate in the card mode. The security module may be a physical medium such as a universal integrated circuit card (UICC) (e.g., a subscriber identification module (SIM) or a universal subscriber identification module (USIM)), a secure micro secure digital (SD) card, and a sticker. Alternatively, the security module may be a logical medium embedded in the mobile terminal 100 (e.g., an embedded secure element (SE)). Data may be exchanged between the NFC and security modules based on a single wire protocol (SWP).

When the NFC operates in the card mode, the mobile terminal 100 may transmit card information to the outside as in the conventional IC card. When the NFC operates in the reader mode, the mobile terminal 100 may extract and read data from an external tag. When the NFC operates in the P2P mode, the mobile terminal 100 may perform P2P communication with another mobile terminal. For the P2P communication, a connection may need to be established between the mobile terminal 100 and the other mobile terminal.

When the mobile terminal 100 is placed on a wireless charging device with a wireless power transmission coil, an induced electromotive force is generated by a magnetic field created by the wireless power transmission coil and makes a current flow. The wireless charging coil 192 may charge the battery using the current. Such a wireless charging technology may use two frequency ranges. According to WPC specifications, the wireless charging technology may use a frequency range from 110 kHz to 205 kHz. According to PMA specifications, the wireless charging technology may use a frequency range from 227 kHz to 278 kHz.

The payment antenna 118 may be used for wireless payment. The payment may be made by transmission of a signal including payment information to a payment terminal. The signal including payment information may be an electromagnetic signal generated when a magnetic card slides into a card leader. The payment antenna 118 may use a low-frequency signal below 100 kHz.

Since the wireless charging coil 192 has the largest size, the wireless charging coil 192 is disposed at the center, and the payment antenna 118 may be disposed such that the payment antenna 118 surrounds the wireless charging coil 192. The NFC antenna 114 may be provided separately from the wireless charging coil 192 and payment antenna 118 to reduce interference to the wireless charging coil 192 or payment antenna 118.

However, considering that the camera module 121b as well as the coil antenna module 200 are disposed on the rear surface of the mobile terminal 100, and the audio output module 152b and the interface unit 160 are mounted at the bottom thereof, there may be no sufficient space on the back of the mobile terminal 100. As a result, there are restrictions on the placement of the back-side touch sensor 210

An area in which the coil antenna module 200 is mounted is defined as a first area. In the related art, a back-side button 123c has been disposed in a second area surrounded by the NFC antenna 114 of FIG. 3. However, according to the present disclosure, the back-side touch sensor 210 may be implemented in the second area for the back-side button 123c.

Figure 4:
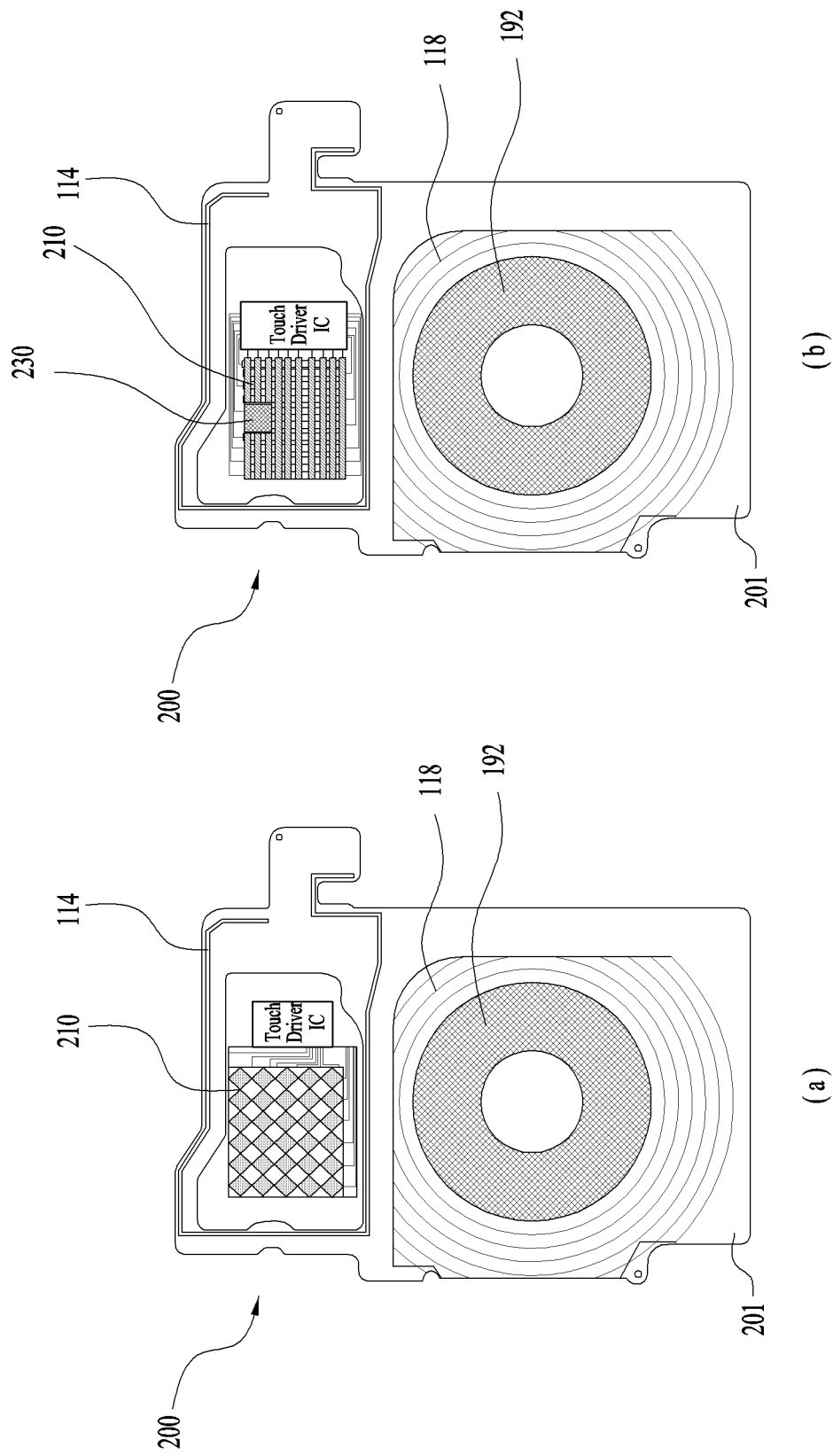
FIG. 4 is a view showing an embodiment of the back-side touch sensor of the mobile terminal according to the present disclosure.

FIG. 4 is a view showing an embodiment of the back-side touch sensor 210 of the mobile terminal 100 according to the present disclosure. In this embodiment, the back-side touch sensor 210 is implemented based on capacitance. As shown in FIG. 4 (a) or (b), the back-side touch sensor 210 has a touch electrode 211 (see FIG. 5) in which a transmission (Tx) electrode and a reception (Rx) electrode are alternately disposed. The Tx and Rx electrodes are not directly connected to each other. However, when power is applied to the Tx electrode, an electromagnetic wave is formed and a current flows into the Rx electrode. If the user touches the touch electrode 211 with a hand, the current flows into the hand so that the amount of current flowing from the Tx electrode to the Rx electrode decreases. In other words, the controller 180 may sense a touch input by detecting a decrease in the current amount in the Rx electrode The shape of the electrode may be a quadrangle as shown in FIG. 4 (a) or a lattice as shown in FIG. 4 (b). The Tx and Rx electrodes are not physically in contact with each other, and more particularly, an insulating material is disposed therebetween. Thus, when the user's hand is contact with the electrodes, the amount of the current flowing from the Tx electrode to the Rx electrode may change.

Each electrode is connected to a touch driver IC for sensing touch. Specifically, the touch driver IC senses a touch input by detecting a change in the current. When the current sequentially changes in the touch electrode 211, the controller may recognize that a drag input is applied in the direction of the current change and then control the screen to scroll or a mouse to move.

Figure 5:
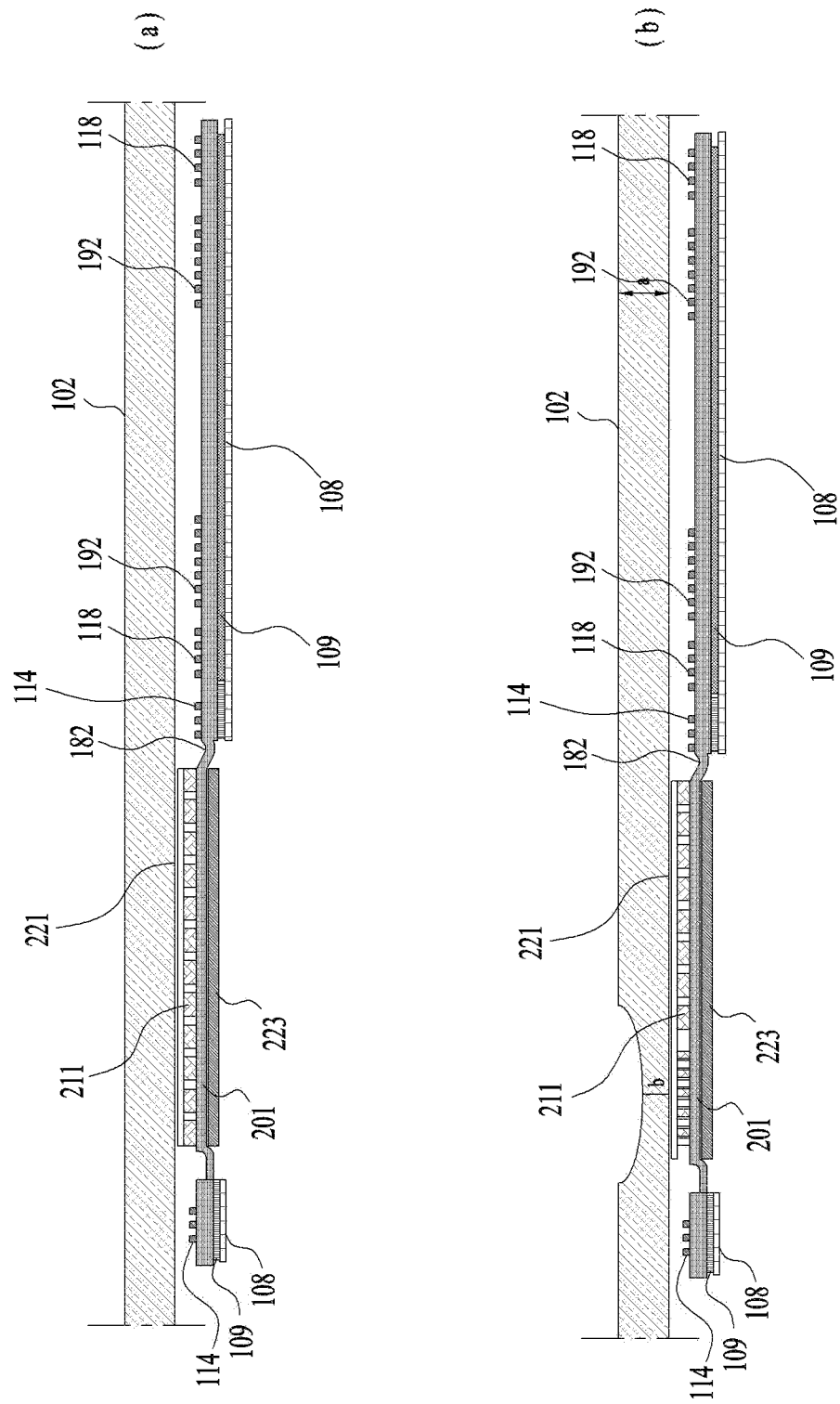
FIG. 5 is a cross-sectional view of a structure in which a coil antenna is integrated according to the present disclosure.

FIG. 5 (*a*) is a cross-sectional view of an embodiment including the back-side touch sensor 210 of FIG. 4 (*a*), and FIG. 5 (*b*) is a cross-sectional view of an embodiment including the back-side touch sensor 210 of FIG. 4 (*b*) and a fingerprint recognition sensor 230. In this embodiment, the back-side touch sensor 210 may be integrated with the back-side coil antenna module 200. In other words, the back-side touch sensor 210 and coil antenna module 200 may be implemented as one component on the flexible substrate 201, which is obtained by forming the Tx and Rx electrodes of the touch electrode 211 and at least one of the NFC antenna 114, the payment antenna 118, and the wireless charging coil 192 together on the flexible substrate 201. The substrate 201 may also include a bent portion 182 as shown in FIGS. 5(*a*) and 5(*b*).

FIG. 4 (*a*) and FIG. 5 (*b*) shows the embodiment including only the back-side touch sensor 210, and FIG. 4 (*b*) and FIG. 5 (*b*) shows the embodiment including both the back-side touch sensor 210 and fingerprint recognition sensor 230. As shown in FIGS. 5 (*a*) and (*b*), an adhesive tape 221 may be used to attach the back-side touch sensor 210 to the rear case 102.

The NFC antenna 114 may further include a ferrite sheet or nano crystal line 108 for blocking electromagnetic waves entering into the inside of the mobile terminal 100 so that electromagnetic waves may propagate to the outside. The NFC antenna 114 needs to communicate with a peer antenna, and thus, the magnetic field of the NFC antenna 114 also needs to be resonant with that of the peer antenna. However, various internal components of the mobile terminal 100 (e.g., a middle frame 105 shown in FIG. 9 which is made of metal, a main substrate 181, etc.) are made of conductive materials, and it may disturb the resonance between the magnetic field of the NFC antenna 114 and the magnetic field of the peer antenna.

To reduce or eliminate the effect of the metal component of the mobile terminal 100, the ferrite sheet or nano crystal line 108 may be provided between the NFC antenna 114 and the internal component. Specifically, the ferrite sheet or nano crystal line 108 may be disposed to be closer to the core of the mobile terminal 100 than the NFC antenna 114.

In addition, the mobile terminal 100 may further include a graphite sheet 109 for dissipate heat locally generated in the mobile terminal 100. The graphite sheet 109 has a higher thermal conductivity in the surface direction than gold, copper, and aluminum. Thus, the graphite sheet 109 may diffuse the heat uniformly.

When the user touches the back-side touch sensor 210 with a finger, pressure is applied. Thus, a stiffener 223 may be disposed on the front surface of the second area to support the pressure applied by the user. The stiffener 223 may use a part of the middle frame 105 disposed inside of the mobile terminal 100 or be supported by the middle frame 105.

As shown in FIG. 4 (*b*), a part of the back-side touch sensor 210 may be used as the fingerprint recognition sensor 230. Although it is shown in the drawing that the fingerprint recognition sensor 230 is located at the upper center of the back-side touch sensor 210, the fingerprint recognition sensor 230 may be located at the center or at one side. When the fingerprint recognition sensor 230 is disposed at one side, a signal line that connects the driver IC for the back-side touch sensor 210 to each electrode may be implemented in a simple way. However, it is more intuitive to dispose the fingerprint recognition sensor 230 at the center from the perspective of the utility.

The fingerprint recognition sensor 230 may detect the ridge and valley pattern of the fingerprint by detecting a current change between two electrodes in a similar way to the capacitive back-side touch sensor 210. However, since the fingerprint recognition sensor 230 detects small unevenness, the pixel size and spacing of each electrode of the fingerprint recognition sensor 230 may be smaller than those of the back-side touch sensor 210 as shown in FIG. 4 (*b*).

As shown in FIG. 5 (*b*), the thickness of the rear case 102 may be reduced at the location corresponding to the fingerprint recognition sensor 230. Thus, the user may sense the location of the fingerprint recognition sensor 230 by touch. A concave shape corresponding to the finger may be formed on the rear surface of the rear case 102 at the location corresponding to the fingerprint recognition sensor 230, and it may guide the user to place the finger at the correct location.

Figure 6:
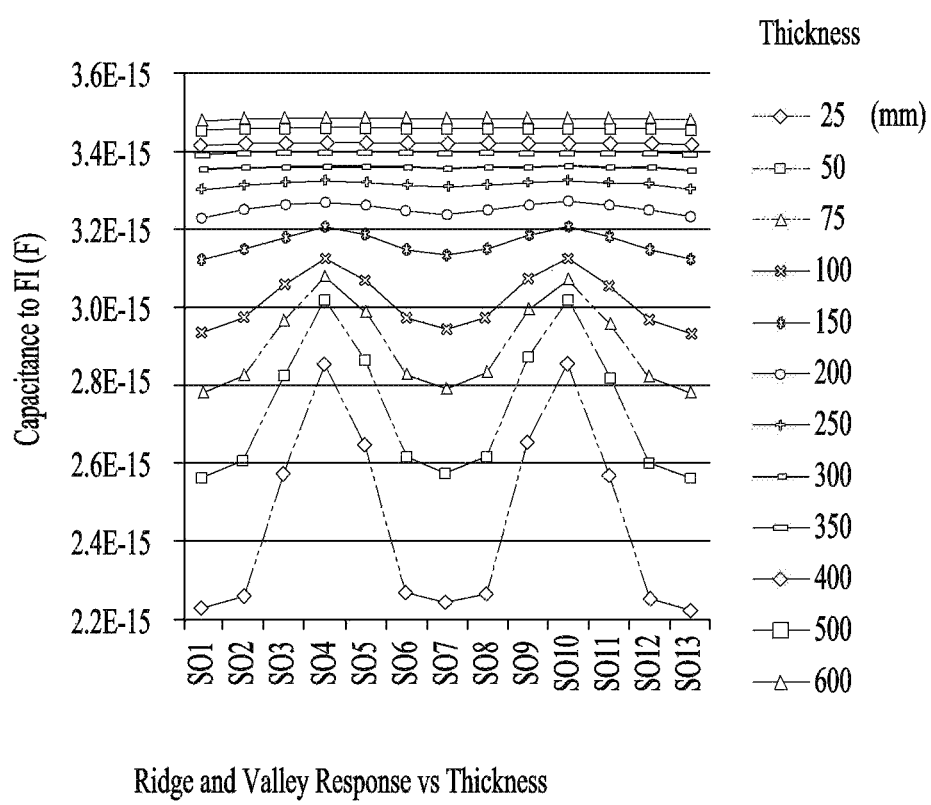
FIG. 6 is a graph for explaining the sensitivity of the back-side touch sensor according to the present disclosure.

FIG. 6 is a graph showing detection performance depending on the distance from the finger to the fingerprint recognition sensor 230. The user is not directly in contact with the electrode of the fingerprint recognition sensor 230. That is, the finger is away from the fingerprint recognition sensor 230 by the thickness of the rear case 102. The graph of FIG. 6 shows the sensitivity of detecting the ridge and valley pattern of the fingerprint when the distance from the finger to the fingerprint recognition sensor 230 is in a range of 25 μm to 600 μm. When the distance is greater than or equal to about 300 μm, there is almost no capacitance difference depending on the ridge and valley pattern of the fingerprint so that the fingerprint recognition sensor 230 may sense no fingerprints. Thus, the distance between the fingerprint recognition sensor 230 and the outer side surface of the rear case 102 needs to be smaller than 300 μm. In particular, the thickness b of the rear case 102 at the location corresponding to the fingerprint recognition sensor 230 may be smaller than the thickness a of the rest of the rear case 102 (b<a).

The fingerprint recognition sensor 230 may sense touch by detecting a change in the current between Tx and Rx electrodes as in the touch electrode 211. Thus, when the fingerprint recognition is not required, the fingerprint recognition sensor 230 may receive a back-side touch input from the user together with the back-side touch sensor 210.

Figure 7:
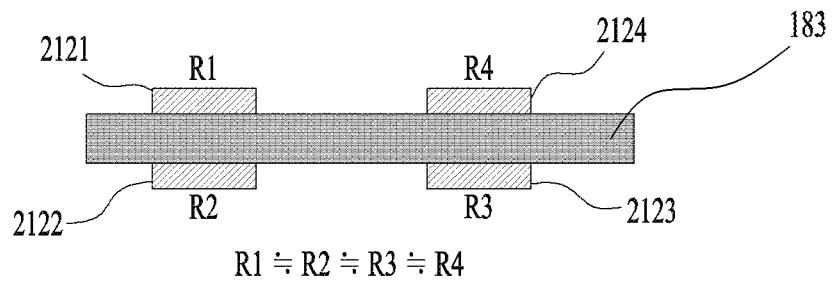
FIGS. 7 to 9 are views illustrating another embodiment of the back-side touch sensor of the mobile terminal according to the present disclosure.
Figure 7:
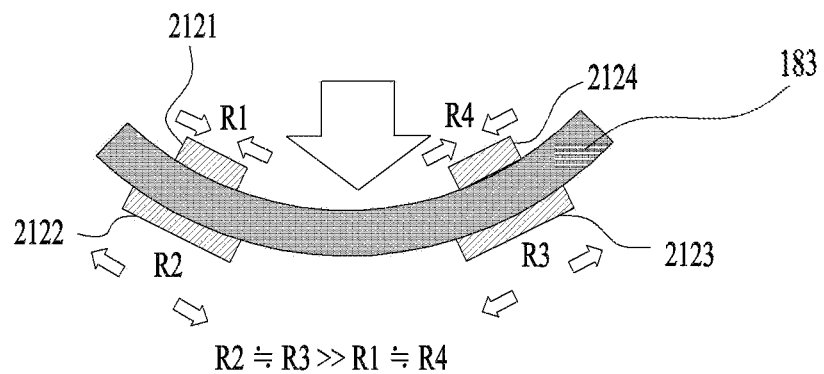
Figure 7:
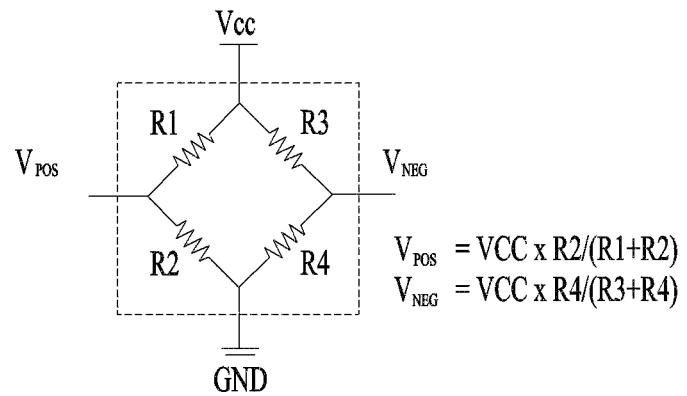
Figure 8:
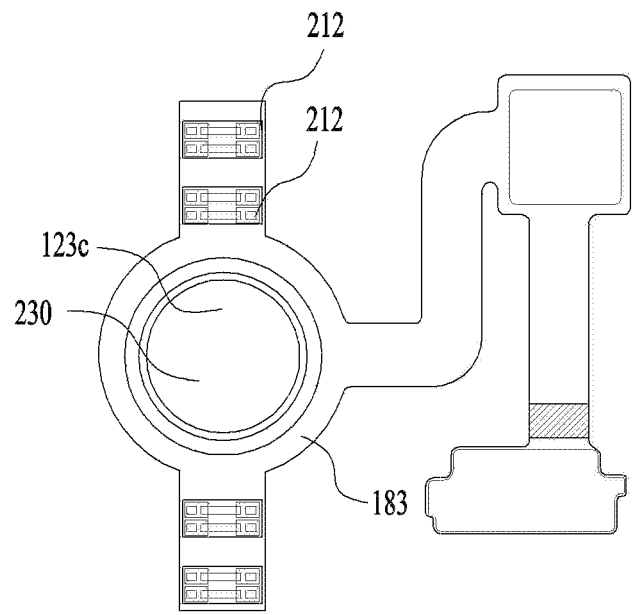
Figure 8:
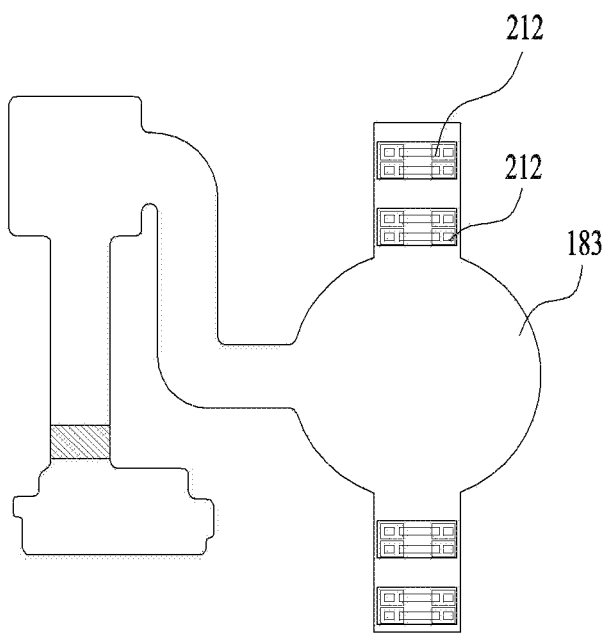
Figure 9:
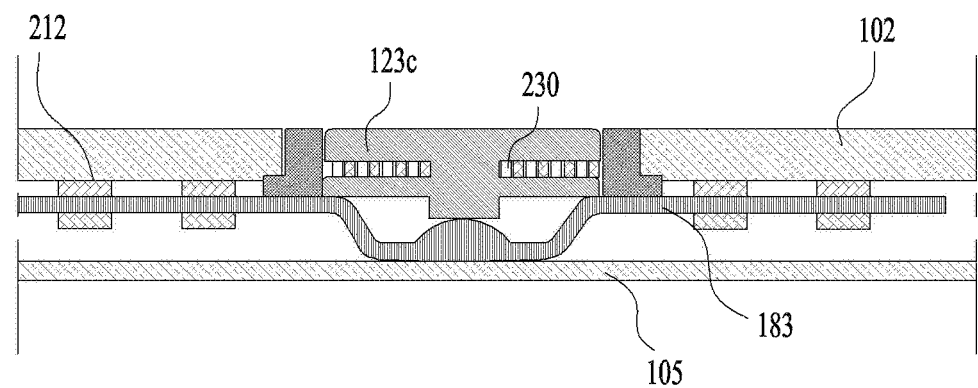

FIGS. 7 to 9 are views illustrating another embodiment of the back-side touch sensor 210 of the mobile terminal 100 according to the present disclosure. In this embodiment, the back-side touch sensor 210 is implemented based on pressure sensing. To sense pressure, a strain gauge 212 may be used. As shown in FIG. 7 (*a*), a plurality of elements 2121, 2122, 2123, and 2124 are mounted as the strain gauge 212 on the flexible substrate 183. When the flexible substrate 183 is bent as shown in FIG. 7 (*b*), the resistance value of each of the elements 2121, 2122, 2123, and 2124 may change since a different force is applied to each of the elements 2121, 2122, 2123, and 2124.

FIG. 7 (*c*) shows a circuit implemented based on the above feature. In this case, deflection may be detected based on the values of Vpos and Vneg. When the four elements 2121, 2122, 2123, and 2124 are stably placed as shown in FIG. 7 (*a*), each of the elements 2121, 2122, 2123, and 2124 has the same resistance (R1 to R4), and thus, Vpos and Vneg have the same value. When the flexible substrate 183 is bent as shown in FIG. 7 (*b*), the resistances (R1 and R4) of the first and fourth elements 2121 and 2124 decrease, and the resistances (R2 and R3) of the second and third elements 2122 and 2123 increase. Thus, the value of Vpos increases, and the value of Vneg decreases. When the value of Vpos is smaller than that of Vneg, the flexible substrate bent in a direction different from that shown in FIG. 7 (*b*).

As described above, the strain gauge 212 may include the four elements 2121, 2122, 2123, and 2124. However, since the back-side touch sensor 210 does not need to sense deflection in the direction opposite to that shown in FIG. 7 (b), the back-side touch sensor 210 use only two elements to sense the deflection of the rear case 102. That is, when the user touches the back-side touch sensor 210, the shape of the rear case 102 may be deformed, and the back-side touch input may be detected based on the resistance value of each element.

In this case, since a space is required for deformation of the flexible substrate 183, the strain gauge 212 may be disposed on the rear case 102, and a space, i.e., an air gap may be formed between the strain gauge 212 and the components of the mobile terminal 100.

FIG. 8 is a view showing an embodiment of the back-side touch sensor 210 and the back-side button 123c. FIGS. 8 (a) and (b) shows the rear and front surfaces thereof, respectively. Since the rear surface of the back-side button 123c is exposed to the outside, FIG. 8 (a) corresponds to the rear surface of the mobile terminal 100.

When the back-side touch sensor 210 is implemented with the strain gauge 212, the back-side touch sensor 210 may be integrated with the fingerprint recognition sensor 230, which is disposed at the position of the back-side button 123c. To implement the strain gauge 212, a part of the flexible substrate 183, which is for the back-side button 123c, may be extended, and then the strain gauge 212 may be mounted thereon. It may be disposed in the vertical direction of the drawing to detect scroll in the vertical direction. When it is extended in the horizontal direction, various back-side touch inputs may be detected.

FIG. 9 shows the vertical cross-section of the embodiment of FIG. 8. The back-side button 123c may be implemented in the form of a dome switch and exposed to the outside. Thus, the fingerprint recognition sensor 230 may be disposed at a position that the user's finger touches. Considering that the fingerprint recognition sensor 230 may detect the back-side touch input as described above, both back-side touch sensor 210 and the fingerprint recognition sensor 230 may detect the back-side touch input.

Figure 10:
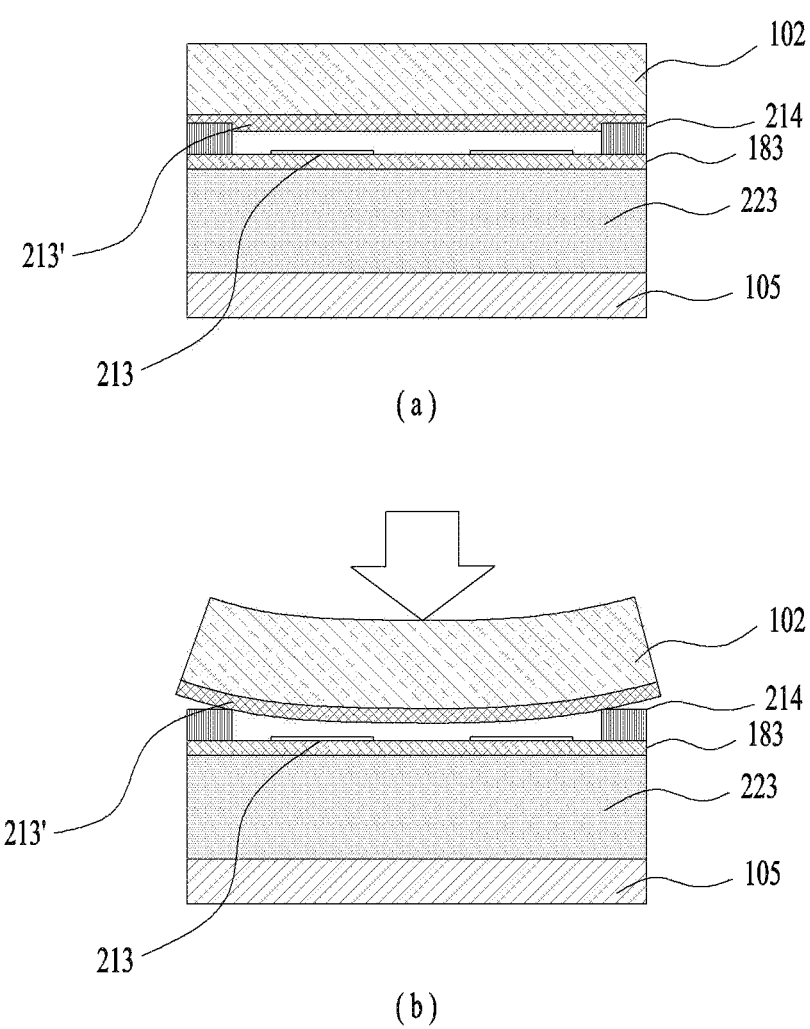
FIGS. 10 and 11 is views showing a further embodiment of the back-side touch sensor of the mobile terminal according to the present disclosure.
Figure 11:
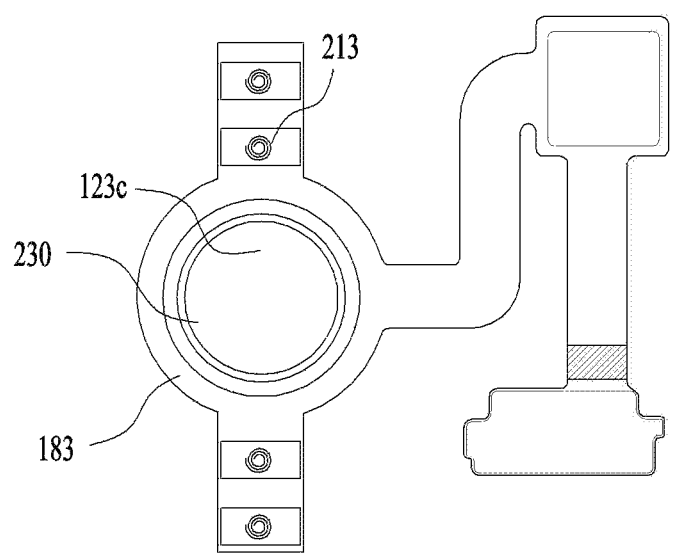

FIGS. 10 and 11 is views showing a further embodiment of the back-side touch sensor 210 of the mobile terminal 100 according to the present disclosure. In this embodiment, the back-side touch sensor 210 is implemented based on current induction. Specifically, the flexible substrate 183 including a signal line for sending a user input received through the back-side button 123c to the main substrate 181 may be extended in this embodiment (see FIG. 11).

According to the current induction, a plurality of sensing coils 213 are used, and an induced current is generated at the sensing coil 213 as a conductive material is adjacent to the sensing coil 213. As shown in FIG. 10 (a), a metal thin film 213' is disposed on the inner surface of the rear case 102, and the plurality of sensing coils 213 are disposed apart from the metal thin film 213' via spacers 214.

As shown in FIG. 10 (b), when the user applies pressure to the rear case 102, the rear case is bent, and the distance from the metal thin film 213' to the sensing coil 213 changes. Then, an induced current flows in the sensing coil 213. By detecting an inductance change caused by the induced current, the back-side touch input may be sensed.

The location of the sensing coil 213 may be fixed. Specifically, the sensing coil 213 may be fixed to the middle frame 105. If the sensing coil 213 is spaced apart from the middle frame 105, the stiffener 223 may be disposed therebetween so that the heights thereof may match with each other.

The mobile terminal 100 according to the present disclosure may include the back-side touch sensor 210 within a limited space as described above. Accordingly, the user may easily manipulate the mobile terminal 100 with one hand.

The front display unit may be further enlarged by providing the fingerprint recognition sensor 230, which was disposed on the front surface in the related art, on the rear surface of the mobile terminal 100. In addition, the finger recognition sensor 230 may be used as a sensor for detecting a touch input, thereby improving the space utility of the mobile terminal 100.

The above-described embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A mobile terminal comprising:
a main body;
a display disposed on a front surface of the main body;
a coil antenna module disposed in a first area on a rear surface of the main body; and
a back-side touch sensor disposed in a second area on the rear surface of the main body and configured to detect a touch input of a user by detecting a change in a signal strength between a plurality of first electrodes; and
a fingerprint recognition sensor disposed in a third area on the rear surface of the main body and configured to sense a curve of a fingerprint by detecting a change in a signal strength between a plurality of second electrodes,
wherein the first and second areas do not overlap with each other, and
wherein a first interval between each of the plurality of second electrodes is smaller than a second interval between each of the plurality of first electrodes.

2. The mobile terminal of claim 1, wherein the second area is surrounded by the first area.

3. The mobile terminal of claim 1, wherein the third area is adjacent to the second area and surrounded by the first area.

4. The mobile terminal of claim 3, wherein the main body further comprises a rear case forming an exterior of the rear surface of the main body,
wherein the coil antenna module, the back-side touch sensor, and the fingerprint recognition sensor are disposed on an inner surface of the rear case, and
wherein the rear case has a smaller thickness in the third area than other areas.

5. The mobile terminal of claim 4, wherein the thickness of the rear case in the third area is smaller than or equal to 0.3 mm.

6. The mobile terminal of claim 4, wherein an outer surface of the rear case comprises a concavely curved surface corresponding to the third area.

7. The mobile terminal of claim 1, further comprising:
a rear case forming an exterior of the rear surface of the main body; and
a flexible substrate disposed on a front surface of the rear case,
wherein the coil antenna module comprises a coil made of a conductive material and formed on the flexible substrate, and wherein the plurality of first electrodes of the back-side touch sensor are formed on the flexible substrate.

8. The mobile terminal of claim 7, further comprising:
a ferrite sheet or a nano crystal line disposed on a front surface of the flexible substrate and covering at least part of the first area.

9. The mobile terminal of claim 7, further comprising:
a heat radiation sheet disposed on a front surface of the flexible substrate and covering at least part of the first area.

10. The mobile terminal of claim 7, further comprising:
a stiffener disposed on a front surface of the flexible substrate and covering at least part of the second area.

11. The mobile terminal of claim 1, wherein the back-side touch sensor comprises:
a flexible substrate; and
a strain gauge disposed on a surface of the flexible substrate,
wherein the strain gauge comprises a plurality of elements, each of which has a resistance value changing when the flexible substrate is bent.

12. The mobile terminal of claim 11, further comprising:
a rear case forming an exterior of the rear surface of the main body, wherein the strain gauge is coupled to an inner surface of the rear case;
an internal component disposed in a front surface direction of the strain gauge; and
an air gap formed between the strain gauge and the internal component.

13. The mobile terminal of claim 1, wherein the back-side touch sensor comprises:
a metal thin film disposed on a rear case forming an exterior of the rear surface of the main body; and
a plurality of sensing coils disposed apart from the metal thin film,
wherein the touch input is detected based on a counter-electromotive force in the plurality of sensing coils.

14. The mobile terminal of claim 1, wherein the coil antenna module comprises:
a wireless power coil configured to wirelessly charge a battery; and
a near field communication (NFC) coil configured to perform short-range wireless communication, and
wherein the back-side touch sensor is surrounded by the NFC coil.

15. The mobile terminal of claim 1, further comprising:
a back-side button disposed on the rear surface of the main body; and
a flexible substrate in which a signal line configured to transmit a signal input through the back-side button to a main substrate is formed,
wherein the back-side touch sensor is formed on the flexible substrate.

16. A mobile terminal comprising:
a main body comprising a rear case forming an exterior of a rear surface of the main body;
a display disposed on a front surface of the main body;
a coil antenna module disposed in a first area on a rear surface of the rear case;
a back-side touch sensor disposed in a second area on the rear surface of the rear case and configured to detect a touch input of a user; and
a fingerprint recognition sensor disposed in a third area on the rear surface of the main body,
wherein the first and second areas do not overlap with each other, and
wherein the rear case has a smaller thickness in the third area than the first area and the second area.

17. The mobile terminal of claim 16, wherein the thickness of the rear case in the third area is smaller than or equal to 0.3 mm.

18. The mobile terminal of claim 16, wherein an outer surface of the rear case comprises a concavely curved surface corresponding to the third area.

* * * * *